United States Patent [19]
Smith

[11] Patent Number: 6,137,636
[45] Date of Patent: Oct. 24, 2000

[54] EFFICIENT OCULAR WITH SPATIALLY MODULATING, REFLECTIVE DEVICE AT INTERMEDIATE IMAGE PLANE

[76] Inventor: James Lynn Smith, 823 Overbrook Dr., Ft. Walton Beach, Fla. 32547

[21] Appl. No.: 09/259,755

[22] Filed: Feb. 27, 1999

[51] Int. Cl.$^7$ ..................................................... G02B 27/14
[52] U.S. Cl. ........................................... 359/630; 359/633
[58] Field of Search .................................... 359/630, 631, 359/633; 345/7–9

[56] References Cited

U.S. PATENT DOCUMENTS

| | | |
|---|---|---|
| 3,517,983 | 6/1970 | Fein . |
| 3,722,998 | 3/1973 | Morse . |
| 4,696,550 | 9/1987 | Shionoya . |
| 4,896,952 | 1/1990 | Rosenbluth . |
| 5,130,530 | 7/1992 | Liu . |
| 5,606,458 | 2/1997 | Fergason ................................. 359/630 |
| 5,621,572 | 4/1997 | Fergason ................................. 359/630 |
| 5,797,050 | 8/1998 | Smith . |

OTHER PUBLICATIONS

Tomilin, et. al. "New eyeglass systems with local light protection from blinding objects", J. Opt. Technol. 64(5) pp. 489–492 (May 1997).
Ivanova, et. al. "Liquid crystals spatial light modulators for adaptive optics and image processing", SPIE Proceedings, 2754 pp. 180–185 (1996).
Smith, et. al. "Real–time optical processing using the liquid crystal light valve," J. Applied Photographic Engineering, 5(4) pp. 236–243 (1979).
Beard, et. al. "AC liquid–crystal light valve," Appl. Phys Lett. 22 (1973).
Hamamatsu Technical data sheet "PAL–SLM Parallel aligned nematic liquid crystal light modulator X5641" (Nov. 1994, Japan).
Bell Laboratories, Pictures from Scientific Research at Bell Laboratories, "Fully–integrated 'smart Pixel' devices" obtained on Nov. 28, 1998 http://portal.research.bell–labs.com/leisure/sovvenirs/gallery/index.html.
Lucent Technologies, Optoelectronic VLSI foundry services from Lucent Technologies, "Hybrid Integration Technology," obtained Nov. 28, 1998 http://www.bell–labs.com/project/oevlsi/.

*Primary Examiner*—Ricky Mack

[57] ABSTRACT

The invention improves on an ocular having at least one spatially modulating, reflective device at one of the possible locations of an intermediate image plane. Emphasis is on the ocular containing the reflective device, rather than that device's function. A list of device functions include nonlinear image light modulation; optical power limiting; planar image processing; reticle, grid or text superposition. All such functions require sharp image focus on the device surface plane. A polarizing beamsplitter, quarter-wave plate means, field lens and roof prism are combined to simultaneously improve optical energy efficiency, sharpen focus and reduce keystoning at the reflective device while increasing the field-of-view for the virtual image of observed scenery. The basic design is complementary to economy of space: Unity-magnification and undeviated line-of-sight use is facilitated for applications such as driving or sighting; its design is also adaptable to binoculars and applications in microscopy and telescopy.

20 Claims, 4 Drawing Sheets

(top view)

(top view)

(top view)

(top view)

(side view)

(side view)

comparison (top view)

(top view)

EFFICIENT OCULAR WITH SPATIALLY MODULATING, REFLECTIVE DEVICE AT INTERMEDIATE IMAGE PLANE

BACKGROUND OF THE INVENTION

1. Field of Invention

This application describes improvements to an ocular with an intermediate image plane at which possible locations at least one spatially modulating, reflective device is placed. The invention provides improvements to the scant examples of this type ocular. Different functions for the reflective device include nonlinear image light modulation; planar image processing; reticle, grid or text superposition, and these functions require sharp image focus on the device surface plane. Improvements relate to optical energy efficiency, sharpened focus and reduced keystoning while increasing the field-of-view for the observed virtual image of external scenery. Use with the eye, a camera or other instrument substituting for the eye is intended.

2. Description of Prior Art

There are many instances in which some modification of viewed scenery is desired. In the simple case of a telescopic gunsight, an intermediate image is formed, and an aiming reticle is placed at this image plane. The observer thus sees virtual imagery with the reticle clearly superimposed. In this case, the reticle may be affixed on glass or composed of cross-hairs neither of which obscures the viewed scenery. In other applications, the device in the intermediate plane is more complex than reticle cross-hairs and cannot transmit light through; being able, however, to modulate imagery through reflection. A case in point is the selective glare reduction ocular (SGRO) of Smith. See FIG. 1a for the ocular configuration. The purpose of that invention, conceived and witnessed in 1991 and issued at a patent in 1998 (U.S. Pat. No. 5,797,050) is to significantly reduce only the brightest parts of brilliant viewed scenery by using a nonlinear attenuator device (NAD) in the intermediate image plane. The invention enables the observer to view moderately illuminated objects in scenery and not be overcome by nearby bright objects in that scenery. Since there are light sensitivity advantages in having a reflective, rather than transmissive, NAD one of the ocular designs shows a reflective NAD at the intermediate plane.

The Smith patent specification teaches necessary concepts to enable one skilled in the art of photoconductor-liquid crystal devices to modify the ferroelectric liquid crystal devices described by Ivanova et. al., the Hamamatsu parallel aligned nematic spatial light modulator (PAL-SLM), and other modulators and use them for a reflective NAD. Component photoconductor films can include sensitized photogenerator-charge transport films of polymer, amorphous $\alpha$-Si:H and pin $\alpha$-SiCH, crystalline and polycrystalline films of CdS, GaP and ZnSe, and other materials. The common feature of all these options is the same as that for examples in the Smith patent: Optical energy on the layered device induces, via the photoconductor, change in the imposed electric field which causes liquid crystal reorientation, and, in conjunction with properly oriented polarizer(s), this translates into attenuation of reflected optical energy. This common feature is described in one of the patent's independent claims Shortly after Smith's application to the aforementioned patent, Tomilin et. al. (1997) independently published a paper sketching a reflective NAD arrangement in an ocular for glare protection. A transmissive type NAD ocular was the main point of the paper, however, and it did not enumerate the complementary characteristics necessary for proper operation of a reflective NAD as did the claims in Smith's patent. Another example of prior art devices for which the ocular described in this application can be employed is the real-time reticle utilization of a liquid crystal light valve described by Beard et. al. (1973). The device modulates reflectivity on its front side according to a CRT image projected onto its rear side. Successors to this type of spatial light modulator is also used in projectors and has higher resolution than active matrix addressed liquid crystal displays, which generally modulate transmittance. Used as a reflective reticle in a sighting instrument, however, the light valve is able to change reticle patterns and impose symbology on imagery in real-time. Yet another example of prior art using a device in the intermediate image plane is the optical power limiter described by Liu (1990). This system is located in the "ocular" for an imaging sensor which needs protection from damaging intensity. If the ocular arrangement were reconfigured so that the power limiting layer were backed by a mirror and became a reflective power limiting device, it would be more sensitive (have lower threshold) because the optical energy passes through the same layer twice. Another invention in the category of power or intensity limiting which could be improved by a reflector behind the device in the intermediate image plane is that of Morse (1973) who used a scattering liquid crystal/photoconductor device. The cost of using a mirror to adapt the latter two inventions to that of an ocular with reflective device in the intermediate plane is a more complex design and acquiring the same problems that occur with all oculars which are the subject of this invention. These problems are discussed below.

The germane point of the foregoing paragraphs on prior art is to establish the existence of (and need for) ocular designs in which a spatially modulating reflective device is placed at the intermediate image plane. Whether the reflective device superimposes text on a virtual image, modulates the contrast, serves as an optical power limiter or serves a multiple purpose is of little consequence to the ocular design improvements needed and described in this application. Therefore problems and solutions connected with this type ocular have very wide application relevance.

3. Problems

The problem with an ocular having a spatially modulating, reflective device in the intermediate plane is the difficulty of getting uniform focus of the image on that device. (See FIG. 1a which depicts the ocular arrangement of one embodiment of Smith's SGRO patent of 1998). Another aspect of this problem is the difficulty of viewing features with uniform focus which the reflective modulator device 25 may impose on the imagery. This problem arises because the most light-efficient use of the reflective device has rays of optical energy 10 coming to and leaving the reflective device plane at widely different angles. This means the intermediate image focal surface 35 is not coincident with the plane of the reflective device. Near-focus can occur only over a small area which translates to a very narrow field-of-view in the virtual imagery. An associated problem is the keystoning. The field of the image projected onto the plane of the reflective device is distorted into a "keystone" shape.

One solution to non-focus and keystoning problems at the reflective device, which is familiar to experienced photographers, is to cant the objective and eyepiece lenses as shown in FIG. 1b so that their curved focal surfaces 35 and 40 essentially coincide with the device plane. Then a field lens 30 is placed in proximity to the surface of the reflective device which does not change focus of any imagery appreciably but increases the field-of-view seen through eyepiece 47. Such an increase is justified due to the larger region of improved focus and decreased field distortion.

For applications with lenses having low f/stop-number, this solution has a drawback because the canted lenses 17 and 47 produce too much off-axis aberration (especially coma) at the surface plane of the reflective device 25. An alternative solution is to use certain beamsplitters (e.g., transparent plates, thin metal film-coated plates or cube beamsplitters composed of two right-angle prism halves joined by metal films and cement) which can get optical energy to the device at near-normal incidence so that a subsequent, wider field-of-view accommodation is justified. The simple beamsplitter approach has been applied to entirely different applications and described, for example, in literature by Fein (1970), Smith (1979), Shionoya (1984) and Rosenbluth (1990). This alternative, however, results in an ultimate optical energy throughput of less than 25%, at best. Such a situation is undesirable and requires an additional component for improvement.

BRIEF SUMMARY OF THE INVENTION

The object of this invention is to improve the quality of focus, freedom from distortion and improved field-of-view associated with a reflective modulator device in the intermediate image plane of an ocular without sacrifice of appreciable optical energy ("appreciable" means about 75% or more of incident optical energy). The means of improvement directs optical energy onto and away from the device surface both at restricted angles (angular spans) about the surface normal. The means includes the use of a polarizing beamsplitter, quarter wave plate and a field lens. Their collective incorporation in this particular type of ocular is novel, unique and solves a practical problem. Advantages occur because of this invention. An example of improved performance this invention offers applies to that version of the Smith (1998) selective glare reduction ocular (SGRO) in which the reflective, nonlinear attenuator device (NAD) employed consists of a modified photoconductor-liquid crystal light valve. This invention incorporated into the SGRO promotes proper reduction of brightest objects for scenery over a wider field-of-view. This furthermore allows better overall situation awareness for the viewing observer and removes the halo of inappropriate brightness modification about objects which would otherwise not focus well over the whole NAD. It also improves brightness reduction at the center of those same overly-bright objects. For oculars with a reflective device which superimposes a reticle, text or other symbology, this invention improves the field-of-view over which the symbols, lines, etc. can be seen without blur. As already indicated, although beamsplitters alone have been used to eliminate this problem in other applications, they lose over 75% of optical energy in their double-pass function of making light more normal to a single, reflective, modulating device. The invention of this application loses only about half this much optical energy for a single reflective device application and thus offers a distinct advantage. Another advantage that will become apparent is the compactness which the design offers. The design for essential function of the invention is complementary to economy of space. Yet another advantage is the direct adaptability of this ocular to a binocular design wherein a single reflective modulator device can suffice for both eyes. Also the concept described in this invention allows embodiment design for an undeviated line-of-sight observation; for unity magnification, the virtual image of a distant object can be made to superimpose or align exactly with the object position when not seen through the ocular. This promotes continuity of scale and direction between scenery seen through the ocular and that in the immediate surroundings seen outside the ocular. This would be an advantage for pilots, vehicle drivers, machinery operators, light inspectors and eye laser protection for soldiers.

REFERENCE NUMERALS IN DRAWINGS

| | |
|---|---|
| 10 | The center ray for radiant energy passing through the ocular |
| 15 | Objective lens |
| 17 | Objective lens canted for improved focus on 25 |
| 20 | Surface for specular reflection |
| 25 | Spatially modulating, reflective device |
| 30 | Field lens placed in ocular after improved focus on 25 |
| 35 | Focus surface for objective lens (affected by lens canting) |
| 40 | Focus surface for eyepiece lens (affected by lens canting) |
| 45 | Eyepiece lens |
| 47 | Eyepiece lens canted for improved image of surface of 25 |
| 50 | Observer eye or camera which substitutes for the eye |
| 55 | Input filter (conditional on application) |
| 60 | Means for correcting right-left image reversal |
| 65 | Output filter (conditional on application) |
| 70 | Incident radiant energy from object scenery |
| 75 | Incident radiant energy mainly s-polarized after reflection from dielectric layer 104 |
| 78 | Rays associated with reflection and top-bottom inversion between lens 160 and eye 200 |
| 80 | Objective lens |
| 85 | Rays which are mainly p-polarized after reflection from interface 106 |
| 90 | Specular reflector (e.g., mirror or right angle prism) |
| 92 | Optional input s-polarizer |
| 94 | Optional input p-polarizing filter |
| 100 | Polarizing beamsplitter (depicted as glass cube with dielectric layer on diagonal) |
| 102 | Optional diffuse, blackened, absorbing surface |
| 104 | Dielectric thin film layers (designed for polarization of reflected/transmitted energy) |
| 106 | Cemented interface between parts of beamsplitting Thompson prism |
| 110 | Quarter wave plate means (sometimes incorporated into spatially modulating, reflective device) |
| 120 | Field lens |
| 130 | Spatially modulating, reflective device |
| 130a | First spatially modulating, reflective device in a dual device embodiment |
| 130b | Second spatially modulating, reflective device in a dual device embodiment |

-continued

Figure 1A:
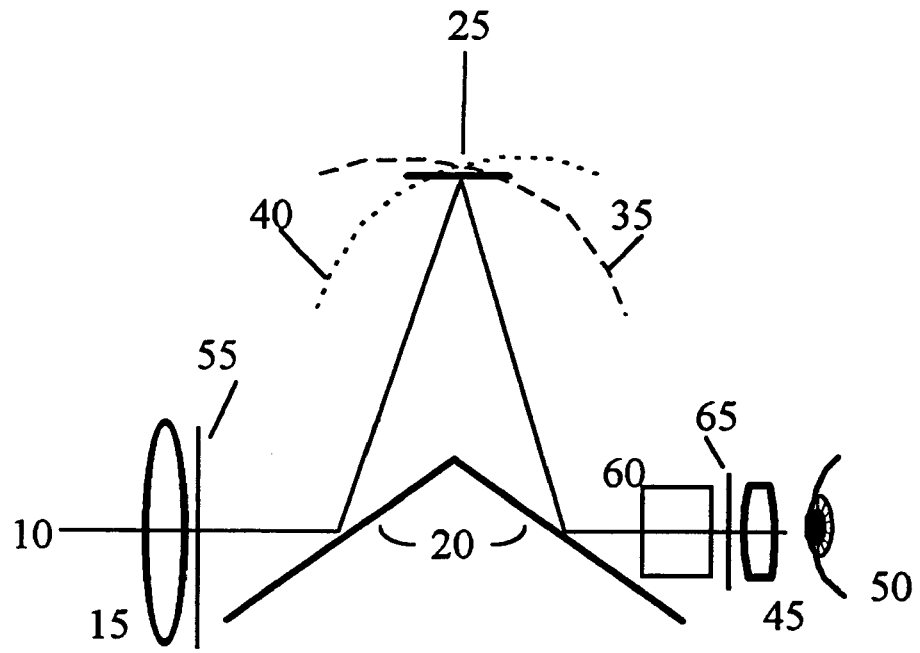
FIG. 1*a* shows an example of an ocular with a spatially modulating reflective device at the intermediate image plane.
Figure 1B:
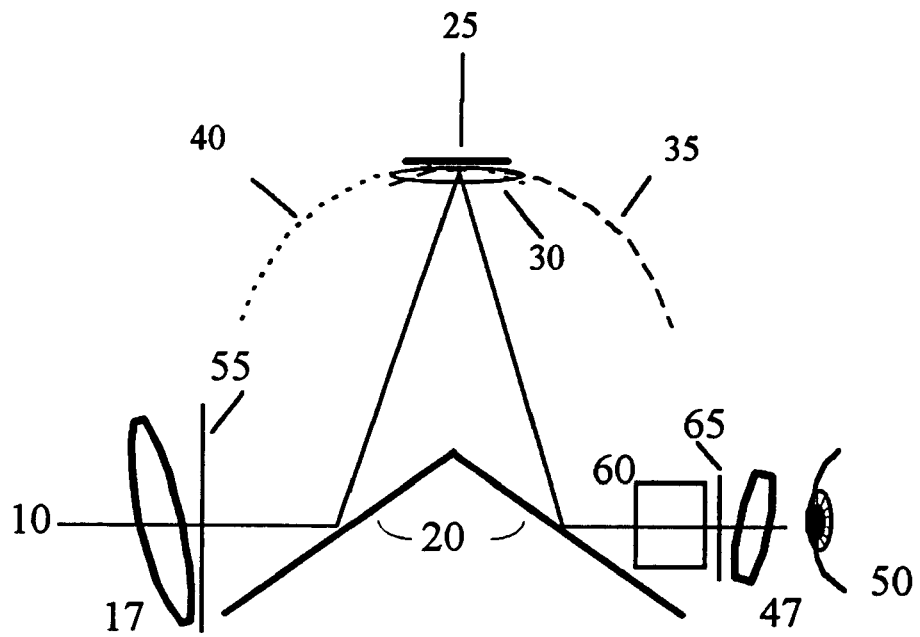
FIG. 1*b* shows the ocular of FIG. 1*a* which incorporates a method to reduce blur and keystoning and to accommodate a wider field-of-view.
Figure 2A:
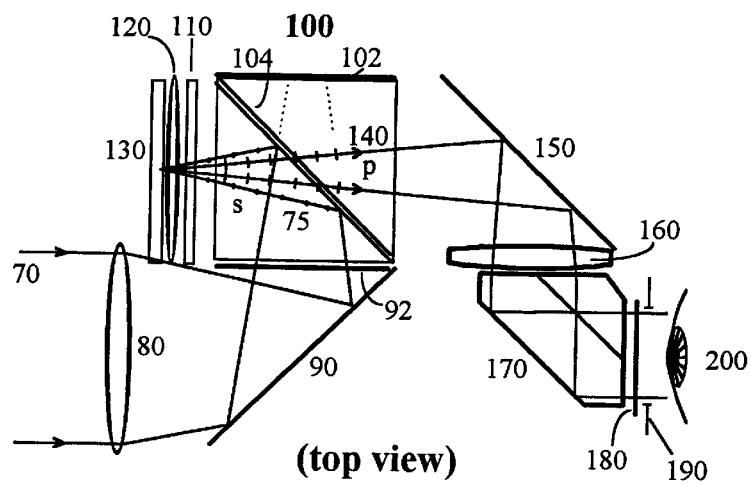
FIG. 2*a* illustrates the simplest preferred embodiment of the subject invention.

| | |
|---|---|
| 133 | Item representing combined reflecting, polarization rotating action of items 110–130 |
| 135 | Single, reflective spatially modulating device sized for binoculars |
| 140 | Radiant energy reflected from device 130 (mainly p-polarized after action of quarter wave plate) |
| 142 | Radiant energy reflected from device 133 (mainly s-polarized after action of quarter wave plate) |
| 145 | First cylinder lens seen from side to show curvature (part of top-bottom inversion option) |
| 147 | Second cylinder lens seen from side to show curvature (part of top-bottom inversion option) |
| 150 | Specular reflector (mirror or right angle prism) |
| 155 | 90 deg folding line for optical rays striking mirror 150 |
| 160 | Eyepiece lens |
| 170 | AMICI roof prism (or device for bending light 90 deg and reversing top and bottom rays) |
| 172 | Farthest half of 90 deg folded mirror option |
| 174 | Nearest half of 90 deg folded mirror option |
| 176 | Plane mirror option in place of lower surface of prism 170 |
| 176b | 90 deg folding line for optical rays striking a mirror like 176 |
| 178 | Schmidt-Pechan prism (reverses top and bottom rays going through via 5 internal reflections) |
| 180 | Optional output p-polarizing filter |
| 182 | Optional output s-polarizing filter |
| 190 | Eyepiece aperture or stop |
| 200 | Observer's eye or camera substituting for eye |
| 200a | Left eye seen from above |
| 200b | Right eye seen from above |
| 230 | Beamsplitting Thompson prism (also known as Foster polarizing beamsplitter prism) |
| 240a | Outline of ocular as configured in FIG. 2a, except for device 130 |
| 240b | Same as outline 240a, except mirrored through a horizontal plane |

DETAILED DESCRIPTION OF INVENTION

Structure

FIG. 2a shows the simplest preferred embodiment of the subject invention. Incoming radiant energy rays 70 are focused onto spatially modulating, reflective device 130 with substantially symmetric angular span about the surface normal by objective lens 80. Specular reflector 90 directs incident radiant energy through optional s-polarizer 92 into cube beamsplitter 100. Mainly rays of s-polarization 75 are reflected from dielectric layers 104 through quarter-wave plate 110 and field lens 120 onto reflective device 130. Optional coating 102 is a blackened, diffuse absorber. After reflection from 130, again with angular span substantially symmetric about the surface normal, mainly p-polarized rays 140 are directed to specular reflector 150, then through eyepiece lens 160, AMICI roof prism 170, optional p-polarizer 180 and small aperture 190 to the eye or camera substitute 200.

Figure 2B:
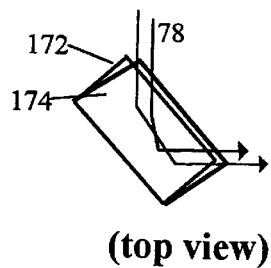
FIGS. 2*b*–2*d* depicts various options for the folding and top-bottom inversion functions performed by the AMICI roof prism (170) of FIG. 2*a*.

FIG. 2b depicts a top-view option to 170 consisting of mirror halves 172 and 174 angled at 90 deg from one another and 45 deg from incoming ray pair 78, members of which are inverted top-to-bottom upon reflection.

Figure 2C:
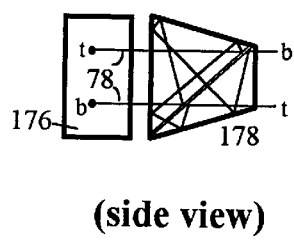

FIG. 2c illustrates a side view option to 170 consisting of a plane mirror oriented at 45 deg (out of the plane of the page) from downward incident rays 78 which are then reflected to Schmidt-Pechan prism 178 which in turn reverses t and b rays after internal reflections.

Figure 2D:
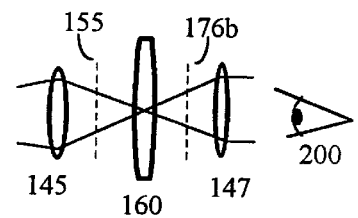

FIG. 2d shows a side view configuration which is an option to use of 170. Ray path is unfolded for instruction. Cylindrical lens 145 is placed just before reflector 150 and a complementary cylindrical lens 147 is placed after eyepiece lens 160. Perforated lines 155 and 176b symbolize ray path folding of 90 degrees at reflector 150 and from mirror 176. The camera or eye 200 receives the rays.

Figure 2E:
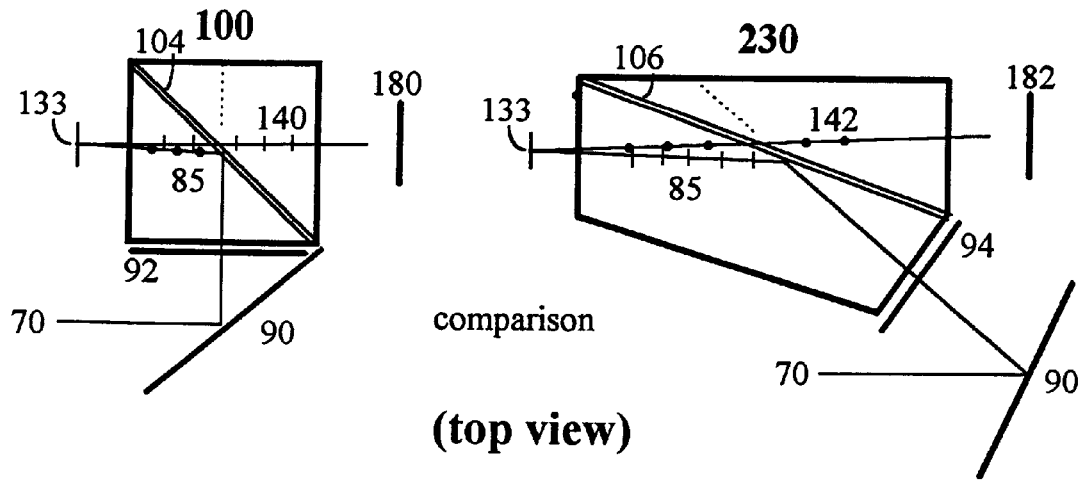
FIG. 2*e* compares a cube polarizing beamsplitter and a beamsplitting Thompson prism as options for slightly different embodiments of the subject invention.

FIG. 2e is a comparison of the cube polarizing beamsplitter 100 and the optional beamsplitting Thompson prism (a.k.a. Foster polarizing beamsplitter) 230. Normally the cube 100 is glass, except for the dielectric thin film stack 104 and is already covered in the description for FIG. 2a. The beamsplitting Thompson prism is calcite and the interface 106 reflects incoming rays 70 as p-polarized rays 85 and transmits s-polarized rays 142 after reflection from device 133. Item 133 symbolizes the combined effects of quarter wave plate 110, field lens 120 and spatially modulating, reflective device 130. Reflector 90 directs rays 70 into beamsplitter 230 and optional p-polarizing filter 94 and optional s-polarizer 182 assist in image purity.

Figure 3:
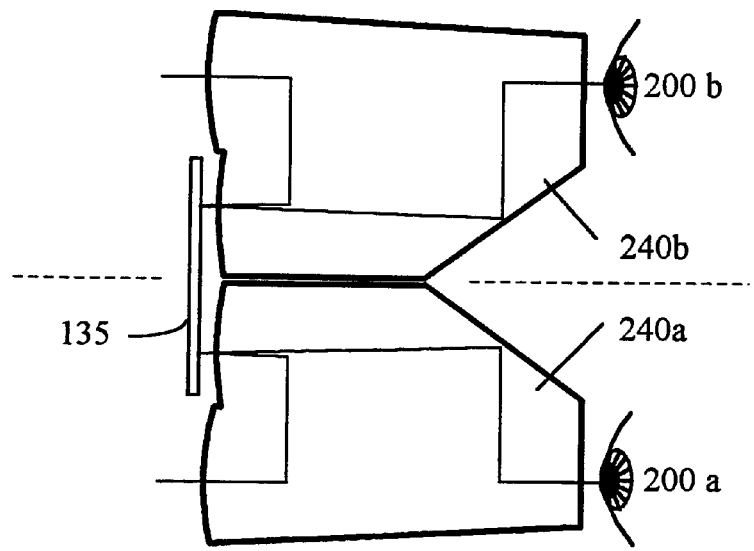
FIG. 3 illustrates the incorporation of two oculars of subject invention into a binocular configuration.

FIG. 3 illustrates the combined effect of the ocular in FIG. 2a (240a shown in outline, except for reflective device 130) with its mirror construction 240b to facilitate binocular viewing by eyes 200a and 200b. A common spatially modulating, reflective device 135 replaces two components 130. The passage of an on-axis ray for each eye is illustrated in its passage through oculars 240a and 240b.

Figure 4:
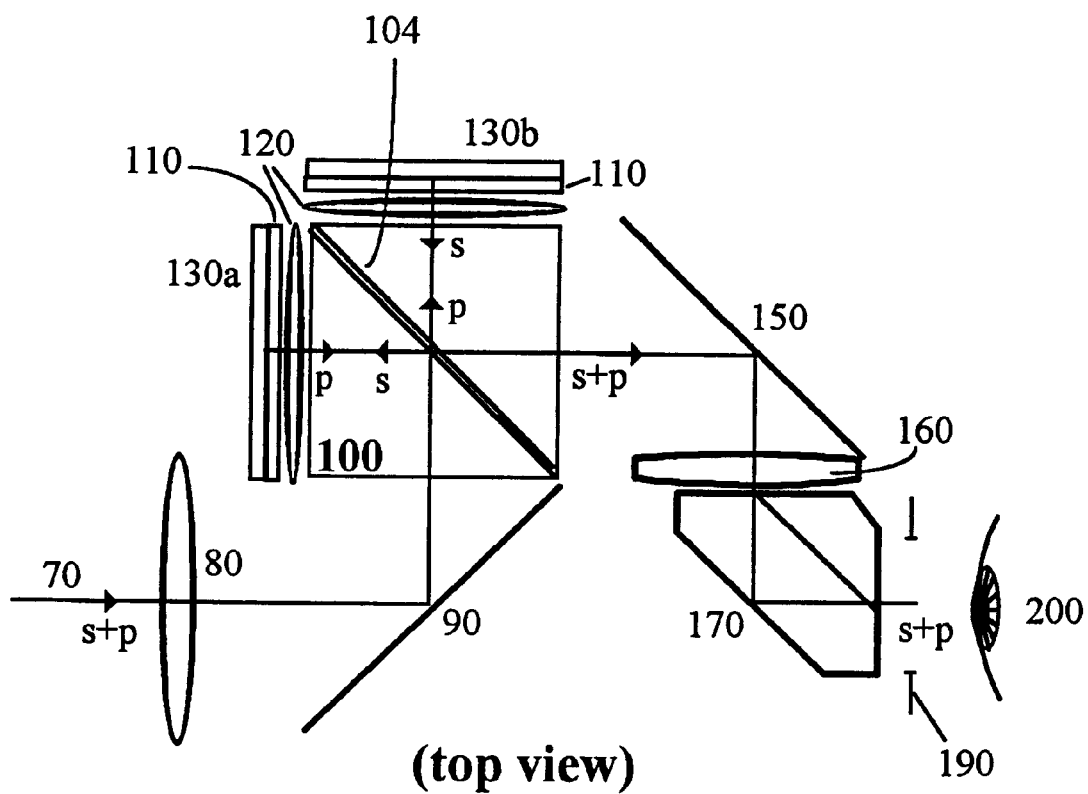
FIG. 4 shows a dual-reflective device embodiment of the invention based on concepts shown in FIG. 2*a*.

FIG. 4 depicts principles of the subject invention applied twice, i.e., incorporated into a preferred dual-reflective device embodiment based on that of FIG. 2a. Incoming optical radiance 70 passes through lens 80, reflects from specular reflector 90 into polarizing beamsplitter 100. Dielectric layer 104, field lenses 120, quarter wave plates means 110, first spatially modulating reflective device 130a and second spatially modulating device 130b are also shown. Arrows indicate the direction of optical radiance and "s" and "p" indicate types of polarization. Specular reflector 150 directs radiance through the eyepiece lens 160 after which it reflects from AMICI roof prism (or equivalent) 170 through aperture 190 to eye or camera substitution 200.

Operation

FIG. 2a illustrates a preferred embodiment which operates to improve focus of objects on the device at the intermediate image plane and increase the field-of-view without sacrifice of appreciable optical energy. First, operation without spatial modulation of radiation is discussed and then a special case example of modulation of bright incident rays is given. Incoming radiant energy rays 70 are imaged by objective lens 80 onto spatially modulating, reflective device 130. Specular reflector 90 directs the incoming rays into cube beamsplitter 100, whereupon they are reflected to device 130 via a special dielectric film stack 104 as s-polarized light 75. The layers 104 encountered at (nominally) 45 deg, mainly transmit p-polarized rays and mainly reflect s-polarized rays. In route to device 130, s-polarized rays pass through quarter-wave plate 110 which is oriented to induce circular polarization via phase retardation and pass through the field lens 120 which hardly affects focus but improves field-of-view. Upon reflection, rays pass through the field lens again and also again through the quarter-wave plate which continues phase retardation and results in p-polarization passing back into the beamsplitter 100. After passing through the layers 104, mainly p-polarized light 140 is directed by specular reflector 150 through smaller eyepiece lens 160 into AMICI prism 170 which folds the ray path 90 deg and inverts top-to-bottom virtual imagery seen by camera or eye 200. (Inversion is a correction of far and near rays already inverted once as seen in the top-view perspective of FIG. 2a.) The observer 200 sees a virtual image of the original object scenery with correct orientation and (unless desired otherwise) undeviated line-of-sight. For a camera which does not need such correct alignment, its placement just after eyepiece lens 160 (with or without beam folding from reflector 150) is satisfactory.

Items 92, 102, 180 are optional but the ocular operates with least unwanted ray scattering and internal reflections if they are included. The s-polarizing filter 92 and p-polarizing filter 180 assist diffuse, blackened absorbing layer 102 in this function.

The reflective device 130 may spatially modulate the rays reflected from it in a variety of ways, the exact nature of which is not a concern of the subject invention. However, as a special example, if the device 130 is a nonlinear attenuator device (NAD) based upon photoconductor and liquid crystal technology for glare reduction, then the brightest rays incident upon it may be reflected back through the quarter-wave plate 110 with a partial change toward s-polarization. These rays are attenuated in transmission through layer 104 and p-polarizer 180 which is consistent with the intended function as a selective glare reducer in scenery. In this and many other examples, the angle of radiant energy incident on the reflective device contains more rays than can be traced to the observer's eye after reflection.

The quarter wave plate means illustrated as 110 represents a functionality only. Some types of reflective NAD incidentally contain birefringence functionality which serves the same purpose as a quarter wave plate for low incident light levels. In such cases, the physical presence of a separate quarter wave plate device located at 110 may be omitted.

The drawing of FIG. 2a suggests distant objects (nearly parallel rays 70) and apparently distant virtual imagery of unity magnification as seen by the observer 200. This condition is specific and restricted to the illustration only. Variations within the scope of the described operation are discussed in the next section.

FIG. 2b is an optional embodiment that depicts the essential operation of the AMICI roof prism 170, except that it consists of two mirrors with halves 172 and 174 joined at 90 deg from each other and oriented at 45 deg with respect to incoming rays 78. The drawing is a top view, and the top (near) ray of 78 is reflected at 90 deg from the mirror combination 172 and 174, but it changes places with the bottom (far) ray of 78. In this way beam-folding into a desired path is attained without top-bottom image reversal in the resulting virtual image.

FIG. 2c is an optional side view embodiment replacing the AMICI roof prism 170. Rays 78 are reflected 90 deg by plane mirror 176 into a Schmidt-Pechan prism 178. The prism 178 causes 5 internal reflections of input rays from sides and a diagonal interface as shown, resulting in an output of rays with the same direction as input, but with top and bottom (t and b) reversed.

FIG. 2d shows an optional side view configuration which is another alternative embodiment to the use of AMICI prism 170. The ray path is unfolded for instruction. Cylindrical lens 145 is placed just before reflector 150 and a complementary cylindrical lens 147 is placed after spherical eyepiece lens 160. Perforated lines 155 and 176b symbolize ray path folding of 90 degrees at reflector 150 and from a mirror such as 176 (shown in FIG. 2c but without the Schmidt-Pechan prism). The camera or eye 200 receives the rays. The cylindrical lenses are arranged with respect to each other and the spherical lens so that their affect on image focus is essentially nullified, but the cross-over of rays from top to bottom causes the desired type of inversion so that the observer 200 sees the image correctly oriented with respect to the object scene and in the same directional alignment. Cylindrical lens 145 focuses at or near the plane of spherical lens 160 and cylindrical lens 147 is approximately at its own focal length from lens 160.

FIG. 2e shows a calcite beamsplitting Thompson prism 230 as an optional embodiment in place of the cube beamsplitter 100. The operation of the cube beamsplitter 100 in FIG. 2a was described above and is included in FIG. 2e for comparison only. Normal intensity radiant energy is assumed in this description. Optical rays 70 incident on specular reflector 90 are directed to the beamsplitter 230 where, after reflection from cemented interface 106, they are transmitted as p-polarized rays 85 to item 133 (which represents the combined action of quarter-wave plate 110, field lens 120 and spatially modulating, reflective device 130). After reflection from item 133 as mainly s-polarized rays 142, transmission through interface 106 occurs. The p-polarizer 94 and s-polarizer 182 are optional, but inclusion reduces unwanted scatter and internal reflection. Except for the exact angles of reflecting surfaces and a reversal of the polarization attained in transmission and reflection from interface 106 (as opposed to 104), the operation of the beamsplitter 230 is like that of the cube beamsplitter 100.

FIG. 3 illustrates operation of the ocular of FIG. 2a (shown as 240a in outline only and without reflective device 130) with its mirror construction 240b and reflective device 135 to form a binocular embodiment. Ocular 240a and ocular 240b are joined as one unit for left and right eyes 200a and 200b, respectively. Two separate spatially modulating, reflective devices of type 130 may be replaced by the one device 135 to insure uniformity. The two separate items are more likely to have uniquely different characteristics than if manufactured as one unit under the same exact conditions. On-axis ray passage for left and right eye is shown as it traces through the ocular halves from objective lens to eyepiece aperture. Not all reflecting components for rays are included in the outline-only depiction.

FIG. 4 depicts application of the principal concepts (shown in FIG. 2a) twice in the same system. This is naturally attained if two reflective devices 130a and 130b are afforded. Both reflective device locations represent the intermediate image plane. Since transmission and reflection through the polarizing beamsplitter 100 is associated with polarizations "p" and "s", a reversal of order yields the same result, except that the opposite polarization would be incident on reflector 150. Placing reflective devices 130a and 130b as shown and orienting quarter wave plate means to induce circular polarization insures that, for no reflective modulation, the return from both reflective devices adds up to a dual polarization result (s+p). The "p" component of optical radiance reaching the eye (or camera) travels the same path and in the same way as described in the operation for FIG. 2a. The "s" component reaching the eye or camera), however, begins as upward moving, transmitted rays with p-polarization which, after passing through dielectric layer 104, passes through field lens 120, quarter-wave plate means 110 (which induces circular polarization) onto spatially modulating, reflective device 130b. For non-modulated operation, rays reflect, and, after passing through the quarter wave plate means 110 again, have s-polarization which in turn reflects with the same polarization along the path toward specular reflector 150. Then these rays are directed through eyepiece lens 160 to AMICI prism (or equivalent) 200 which then directs rays through aperture 190 to the eye (or camera) 200. The sum total operation can be twice as efficient with optical energy as that of FIG. 2a, but requires two reflective devices, two field lenses and two quarter wave plates means because the same operational principle is applied twice. For modulated operation, both spatially modulated, reflective devices 130a and 130b either reflect with spatially altered efficiency or with spatially altered polarization so that the aggregate of rays finally leaving layer 104 toward the eye contains a spatial intensity pattern. Also note: a simple 45 degree turn of either of the quarter wave plates means to a neutral-effect position will reverse the normally bright field perceived by the eye (or camera) from the proximal reflective device and produce a dark field. In this case modulation by that reflective device is necessary to perceive brightness from it through the ocular.

Ramifications and Scope

This invention cites an ocular with an intermediate image plane at which possible locations at least one spatially modulating, reflective device is placed. The invention provides improvements to the scant examples of this type ocular and thus opens possibilities for wider application. Emphasis is upon the ocular containing the reflective device, rather than that device's function. Different functions for the reflective device include nonlinear image light modulation; optical power limiting, planar image processing; reticle, grid or text superposition, and all such functions require sharp image focus on the device surface plane. Aforementioned improvements relate to optical energy efficiency, sharpened focus and reduced keystoning while increasing the field-of-view for the observed virtual image of external scenery. The basic design for essential function is complementary to economy of space: Unity-magnification and undeviated line-of-sight usage is facilitated for such applications as driving or sighting; its design is also adaptable to binoculars and applications in microscopy and telescopy.

Application of this invention to an improved direct-observation system such as the selective glare reduction ocular of Smith (1998) is just one of many utilizations. Additionally this invention is well suited to advantageous use of an arrangement where the reflective version of Smith's SGRO is used in reverse as a contrast enhancer. For the reflective, nonlinear, attenuator device derived from a modified, optically addressed, liquid crystal light valve, a reorientation of the output polarizer will enhance the lighter regions and thus increase contrast. An ocular with this arrangement could be used to examine pale specimens with only very low contrast between regions of interest. This has applications in peering through fog, examining art, forensic science, and medical examinations. Other current and future applications which this invention fosters include assisted image interpretation, machine vision or other applications where "smart pixel arrays" are used for the reflective, spatially modulating device. Lucent Technologies and Bell Laboratory innovations have technology wherein light incident upon the pixellated device is processed by microstructures which, in turn, modulate reflectance from the pixels. Depending upon the nature of processing, this may do image analysis and, through modulation of reflectivity, superimpose data, reticles, instructions or identifying text on the scene viewed. Man or machine could be the recipient of the result. It should be evident that the subject ocular in this invention could be used not only as a unity-magnification system worn or positioned directly in front of the eye, but in microscope, telescope or binocular applications with or without direct observation.

The scope of this invention covers means and improvements to an ocular having an intermediate image plane at which a spatially modulating, reflective device is located; such means and improvements being to attain better optical energy efficiency, sharper focus at the reflective device and promote wider field-of-view of well-focused virtual imagery for the observer. It is to be understood that the lenses depicted in figures are symbolic and represent any close combination of optical elements (cemented doublets, stops, etc.) necessary for low optical aberrations which, as a unit, perform the refractive function indicated. The term "polarizing beamsplitter" includes cube glass/dielectric film beamsplitters, lesser effective polarizing plate beamsplitters, and calcite crystals such as the Glan polarizing prisms with air gap and the beamsplitting Thompson prism. Although the latter beamsplitter geometry is slightly different, the principle of operation is identical.

Other embodiment variations falling within the scope of this invention are as follows: The specific configuration illustrated in FIG. 2a suggests unity magnification, but increased telescopic magnification can be attained by increasing focal length of the objective lens 80 and/or decreasing the focal length of eyepiece 160, both changes requiring repositioning such that the reflective device 130 remains at the focus surface of either lens. On the other hand, increased microscopic magnification requires, to begin with, a very small, short focal length objective lens which is closer to the object scenery than the reflective device 130; in this case a decrease of objective lens focal length and/or a decrease of the eyepiece lens focal length will cause greater magnification (positioning for focus of the object scenery and intermediate plane reflective device is still required). The specular reflecting surfaces 90 and 150 can be those of simple mirrors or right-angle prisms, either being familiar means of attaining mirror-like reflections. Mirror 150 and prism 170 can be eliminated if the observer's "eye" were a camera for which 180 degree inversion and undeviated line-of-light observation is unimportant. If the camera lens is modified to incorporate the optical power of lens 160, only one lens suffices for both eyepiece and camera. However the "effect" of an eyepiece lens remains intact, and fusion with a camera rather than the eye does not constitute a new invention.

The fact that polarization phenomena is used in the beamsplitting components of the ocular described in the subject invention does not mean the spatially modulating, reflective device must do the same. For reflective attenuation based on random scattering of rays from the reflective device 130, that attenuation is attained because many of the scattered rays cannot pass through small aperture 190 shown in FIG. 2a. The same can be said of deformable mirror devices with pixels which reflect light normally or deflect at an angle. Moreover reflective attenuation based on guest-host liquid crystal devices occurs without compromise in this ocular simply because absorption occurs in the guest dyes which are attached to the liquid crystals. It is also possible that one reflective device 130- has light emitting diodes or other radiance behind or on its reflective surface.

This patent application teaches the general idea on how existing and potential art can be adapted to the subject invention. Numerous modifications and substitutions not explicitly covered can be inferred from this teaching. These and many other modifications fall within the spirit and scope of the subject invention. The technology and specific embodiments taught herein do not limit the concept and spirit of the subject invention, and its scope should be inferred from the claims.

Glossary of Selected Terms

1. Beam folding and reversing means: Device or system which, through multiple reflections, both redirects the path of incident optical rays and inverts the order of rays (nearest and farthest in FIGS. 2a and 4) along a dimension perpendicular to the direction of propagation. Examples include the AMICI roof prism, mirror segments joined at 90 degrees, plane mirror and Schmidt-Pechan prism combination, and a mirror-cylindrical lens pair combination. (Also see FIGS. 2a–2d.)

2. Electric field responsive liquid crystal layer: Layer of liquid crystals in a complex layered device (including a photoconducting layer) of a class which responds to electric field change (induced by photoconduction) by change of crystal axis directions. Class examples include but are not limited to modes of ferroelectric liquid crystals, twisted or parallel aligned nematic liquid crystals and guest-host nematic liquid crystals. Results of the change of field include polarization altering birefringence changes, host crystal realignment with (dye) guest optical absorption, and scattering of optical energy.

3. Improved optical energy efficiency: Successive reflection and transmission of non-polarized optical rays by a non-polarizing beamsplitter which directs optical rays to and from a single, perfect reflective device occurs with optical energy efficiency less than 25%, typically 20%. The combined means of the subject invention improves this efficiency beyond 20% with a theoretical maximum of 50% (100% for properly polarized incident rays). For the dual-reflective device embodiment, the efficiency can be doubled.

4. Independent modulating influence: Non-optical spatial influence on the spatially modulating, reflective device such as programmed and real-time signals or simple imprinting which affects spatially dependent reflectance. Also additive radiance such as light emitting arrays behind or on a slightly transparent reflecting surface may contribute.

5. Intermediate image plane: A geometric term associated with the planar imagery at one focus distance from the objective lens; possible presence of any type beamsplitter in the optical path induces two-fold degeneracy resulting in dual locations of the plane; mirrors in place of a beamsplitter would afford only one possible location.

6. Inversion, t-b: Reversal of top and bottom rays only (as illustrated) of rays previously inverted; it corrects image orientation.

7. Inversion, 180°: Reversal of top-bottom and left-right rays turns resulting image upside down.

8. Keystoning: Distortion of the field of an image projected onto a surface at an angle; shorter side on the surface nearest the incident rays and elongated side farthest from the incident rays.

9. Lens: Refractive unit for imaging characterized by an effective aperture and a focal length; may however be comprised of multiple distributed or combined refractive elements to optimally perform its single function; eyepiece lens is generally a stand-alone unit, but may be incorporated with a camera in a combined ocular-camera instrument; objective lens is the lens nearest object scenery.

10. Ocular: Optical instrument for viewing external scenery with the eye, a camera, or an instrument substituting for the eye. Can be quite complex (as in subject invention) but contains at least an objective lens and an "eyepiece" lens.

11. Off-axis aberration: Blur or smear in a focused image caused when the normal to the projecting lens is canted away from the center ray passing along its original axis; coma is the prime example.

12. Photoconducting film: Film possessing photogeneration and charge transport with either homogeneous or layered structure; examples include sensitized photogenerator-charge transport layered polymer film, amorphous pin a-SiCH and a-SiCH films, and crystalline or polycrystalline CdS, GaP and ZnSe films.

13. Polarizing beamsplitter: Any of several devices which separate incident optical energy, via reflection and transmission, into rays along two different paths. Reflected and transmitted rays have substantial difference in polarization. For incident rays already polarized, the device operates as a polarizing filter. Examples include the glass/dielectric layer polarizing cube beamsplitter, dielectric coated glass plates, the calcite beamsplitting Thompson prism and calcite Glan polarizer prism. (Also see FIGS. 2a and 2e.)

14. Polarization-state regions: Locations of possible regions of the intermediate image plane determined by a polarizing beamsplitter; there are normally two for such a beamsplitter, one for s-polarization and one for p-polarization.

15. P-polarization: For transmission and reflection at polarizing interfaces, the e-field polarization which is in the plane of incidence/reflection of optical rays and also perpendicular to ray direction; for FIGS. 2a and 2e, in the plane of the page.

16. P-polarizer: Filter or mechanism which passes only optical rays with e-field consistent with p-polarization; for drawings 2a and 2e, in the plane of the page.

17. Quarter-wave plate functionality means: Thin plate of quartz, mica, thin plastic, etc. which acts as a phase retarder; if oriented 45 deg to incident polarization, it will cause linear polarization to become circularly polarized after passing through. A reflection-caused double pass would result in polarization perpendicular to that of the original incident radiance, and rays would be then able to transmit through a polarizing beamsplitter which earlier reflected rays from an external object and induced the polarization incident on the quarter-wave plate. Some types of reflective, spatially modulating devices incidentally contain quarter-wave retarding functionality at low radiant exposure, and thus preclude the need for its separate existence as another plate.

18. S-polarization: For transmission and reflection at polarizing interfaces, the e-field polarization which is parallel to the plane of the interface (sagital) and perpendicular to ray direction; for FIGS. 2a and 2e, normal to the plane of the page.

19. S-polarizer: Filter or mechanism which passes only optical rays with e-field consistent with s-polarization; for drawings 2a and 2e, normal to the plane of the page.

20. Specular reflector: A surface, whether dielectric, metallic or the back part of a prism, which reflects light like a smooth, mirrored surface.

21. Superimposed content: Meaningful content appearing on or with object scene imagery due to independent modulating influence on the spatially modulating reflective device. Examples include video imagery, real-time or intermittent text, and a reticle or grid structure.

22. Undeviated line-of-sight: Same as directional alignment; angular positioning of a virtual image point which is in the same direction from the observer as it would be if seen without the ocular.

Cited Prior Art Literature
Patents:

| | | | |
|---|---|---|---|
| 3,517,983 | issued 6/30/1970 | Fein | U.S. class/subclass 350/160 |
| 3,722,998 | issued 3/27/1973 | Morse | U.S. class/subclass 355/71 |
| 4,696,550 | issued 9/29/1987 | Shionoya | U.S. class/subclass 350/351 |
| 4,896,952 | issued 1/30/1990 | Rosenbluth | U.S. class/subclass 350/445 |
| 5,130,530 | issued 7/14/9992 | Liu | U.S. class/subclass 250/216 |
| 5,797,050 | issued 8/18/1998 | Smith | U.S. class/subclass 396/241 |

Other Publications:

Tomilin, M. G., Onokhov, A. P. and Firsov, N. T. "New eyeglass systems with local light protection from blinding objects", *J. Opt. Technol.* 64(5), pp. 489–492 (May 1997)

Ivanova, N. L. et. al., "Liquid crystal spatial light modulators for adaptive optics and image processing", SPIE Proceedings, 2754, pp. 180–185 (1996)

Smith, J. Lynn, Guenther, B. D. and Christensen, C. R., "Real-time optical processing using the liquid crystal light valve", *J. Applied Photographic Engineering,* 5(4), pp. 236–243 (Fall 1979)

Beard, T. D., W. P. Bleha, and S. -Y Wong, "Ac liquid-crystal light valve", Appl. Phys. Lett. 22 (1973).

Hamamatsu technical data sheet, "PAL-SLM Parallel aligned nematic liquid crystal spatial light modulator X5641" (November 1994, Japan)

Internet Pages:

Bell Laboratories, *Pictures from scientific research at Bell Laboratories,* "Fully-integrated 'smart-pixel' devices", Internet web pages, obtained on Nov. 28, 1998, http://portal.research.bell-labs.com/leisure /souvenirs/gallery/index.html Lucent Technologies, *Optoelectronic VLSI foundry services from Lucent Technologies,* "Hybrid Integration Technology", Internet web page, obtained on Nov. 28, 1998, http://www.bell-labs.com/project/oevlsi/

I claim:

1. An ocular comprising an objective lens which introduces an image of external objects into said ocular, a spatially modulating, reflective device on which said image is formed and a polarizing beamsplitter; said polarizing beamsplitter directing rays of optical, radiant energy from said objective lens onto and away from said reflective device; angular spans of both incident and reflected rays on said reflective device being substantially symmetric about the normal of said reflective device surface.

2. The ocular of claim 1 for which a quarter wave plate is positioned between said polarizing beamsplitter and said spatially modulating, reflective device; wherein, for spatially local regions where said reflective device acts as a simple mirror, optical energy efficiency of the ocular is greater than if a nonpolarizing beamsplitter were used.

3. The ocular of claim 1 in which an eyepiece lens is positioned after said polarizing beamsplitter.

4. The ocular of claim 1 in which the polarizing beamsplitter comprises a glass cube with thin film dielectric layers of predetermined thickness at an internal diagonal which separates the cube into two right angle prisms; said prisms sandwiching said layers and cemented together at said diagonal; said beamsplitter known as a polarizing cube beam splitter.

5. The ocular of claim 1 in which a field lens is placed in proximity to and parallel with the plane of said spatially modulating, reflective device.

6. The ocular of claim 1 adding an eyepiece aperture and a beam folding and reversing means in front of said aperture; said beam folding and reversing means simultaneously folding the ray path once and reversing the order of previously reversed optical rays in a dimension perpendicular to the direction of ray propagation; wherein said beam folding and reversing means insures that the orientation and direction of both external object and virtual image of said object as seen by observer are substantially the same.

7. The ocular of claim 6 used in a binocular configuration; said ocular duplicated for bilateral symmetry in said configuration and having component duplicate polarizing beamsplitters closest to each other with component objective lenses farthest from each other; said configuration also having both objective lenses farthest from the observer and both eyepiece lenses nearest the observer.

8. The ocular of claim 6 used in a binocular configuration; said ocular duplicated for bilateral symmetry in said configuration and having component polarizing beamsplitters closest and component objective lenses farthest; said configuration also having the spatially modulating, reflective devices of the oculars conjoin into one reflective device with two imaging regions.

9. The ocular of claim 6 wherein said beam folding and reversing means is a prism known as an AMICI roof prism.

10. The ocular of claim 6 wherein said beam folding and reversing means is a modification of an AMICI roof prism; wherein said modification is removal of excess material where it simultaneously exists outside the desired optical ray path and presents obstruction to fitting into an ocular housing which offers least obstruction to scenery perceived by the observer around the ocular field of view.

11. The ocular of claim 6 with an eyepiece and with dimensions selected for unity magnification and undeviated line of sight for distant objects.

12. The ocular of claim 1 in which a second lens simultaneously serves as an eyepiece lens and the objective lens of a camera; wherein an increase of power in said second lens promotes an efficient design for combining ocular and camera.

13. The ocular of claim 1 in which quarter wave plate functionality is intrinsic to the spatially modulating, reflective device, wherein existence of a quarter wave plate and said reflective device as separate optical elements is not required.

14. The ocular of claim 1 further comprising a second spatially modulating, reflective device; each of said reflective devices having a means for quarter wave plate functionality through which optical rays pass to and from the mirror layer of said reflective device; one of said reflective devices receiving incident rays from the polarizing beamsplitter with s-polarization and the other of said reflective devices receiving incident rays from the polarizing beamsplitter with p-polarization.

15. An ocular comprising an objective lens which introduces an image of external objects into said ocular, a spatially modulating, reflective device which responds to the optical energy of said image focused upon it by altering its reflective properties, and an eyepiece lens; said ocular improved by its further comprising a polarizing beamsplitter and a means for quarter wave plate functionality which collectively direct rays of optical, radiant energy onto and away from said reflective device with increased optical energy efficiency in spatially local regions where it functions as a simple mirror; increased efficiency being relative to use of a beamsplitter which does not polarize; said reflective device positioned so that angular spans of both incident and reflected rays are substantially symmetric about the normal of said reflective device surface thereby reducing keystone distortion and blur.

16. The ocular of claim 15 for which said spatially modulating, reflective device is a photoconductor liquid crystal, layered device from a group encompassing glare reduction, optical power limiting and contrast enhancement applications; the photoconductor component being a photoconducting layer.

17. The ocular of claim 15 for which said spatially modulating, reflective device is a photoconductor liquid crystal, layered device from a group encompassing glare reduction, optical power limiting and contrast enhancement applications; the liquid crystal component being an electric field responsive liquid crystal layer.

18. The ocular of claim 15 for which said spatially modulating, reflective device comprises structure known as a smart pixel array; whereby computer and embedded microprocessor options for sensing optical energy and controlling the reflectivity pattern at said reflective device are attained.

19. The ocular of claim 15 in which quarter wave plate functionality is intrinsic to the spatially modulating, reflective device, wherein existence of a quarter wave plate and said reflective device as separate optical elements is eliminated.

20. An ocular comprising an objective lens, a spatially modulating, reflective device upon which an intermediate image of external objects is formed by said objective lens, and an eyepiece lens; said reflective device not responding to optical energy focused upon it, but due to independent modulating influence, regulating reflective properties so that superimposed content appears on said image; said ocular improved by further comprising a polarizing beamsplitter and a means for quarter wave plate functionality to direct rays of optical, radiant energy onto and away from said reflective device with increased optical energy efficiency in spatially local regions where it functions as a simple mirror; said increase being relative to the use of a beamsplitter which does not polarize; said reflective device positioned so that angular spans of both incident and reflected rays are substantially symmetric about normal of said reflective device surface thereby reducing keystone distortion and blur.

* * * * *